(12) United States Patent
Trincia

(10) Patent No.: US 11,416,074 B1
(45) Date of Patent: Aug. 16, 2022

(54) ELECTRONIC DEVICES HAVING FLEXIBLE LIGHT GUIDES

(71) Applicant: Apple Inc., Cupertino, CA (US)

(72) Inventor: Nicholas R. Trincia, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 16/680,902

(22) Filed: Nov. 12, 2019

Related U.S. Application Data

(60) Provisional application No. 62/791,520, filed on Jan. 11, 2019.

(51) Int. Cl.
| | | |
|---|---|---|
| *G06F 3/01* | (2006.01) | |
| *F21V 8/00* | (2006.01) | |
| *G02B 1/04* | (2006.01) | |
| *G01J 1/02* | (2006.01) | |
| *F21V 33/00* | (2006.01) | |
| *G06F 3/042* | (2006.01) | |
| *G01J 1/04* | (2006.01) | |
| *F21Y 115/10* | (2016.01) | |

(52) U.S. Cl.
CPC .......... *G06F 3/014* (2013.01); *F21V 33/0008* (2013.01); *G01J 1/0238* (2013.01); *G01J 1/0425* (2013.01); *G02B 1/045* (2013.01); *G02B 6/001* (2013.01); *G06F 3/042* (2013.01); *F21Y 2115/10* (2016.08)

(58) Field of Classification Search
CPC .. G02B 6/0035; G02B 6/0036; G02B 6/0038; G02B 6/0041; G02B 6/0043; G02B 6/0073
See application file for complete search history.

(56) References Cited

U.S. PATENT DOCUMENTS

| | | |
|---|---|---|
| 8,328,403 B1 | 12/2012 | Morgan et al. |
| 8,934,952 B2 | 1/2015 | LeBoeuf et al. |
| 9,292,008 B1 | 3/2016 | Ahamed et al. |
| 9,310,551 B2 | 4/2016 | Sherman et al. |
| 2007/0133935 A1* | 6/2007 | Fine .................. G02F 1/011 385/131 |
| 2007/0239232 A1* | 10/2007 | Kurtz ................. G02B 6/001 607/87 |

(Continued)

FOREIGN PATENT DOCUMENTS

WO    2015161070 A3    10/2015

*Primary Examiner* — Andrew J Coughlin
(74) *Attorney, Agent, or Firm* — Treyz Law Group, P.C.; G. Victor Treyz; Kendall P. Woodruff

(57) ABSTRACT

An electronic device such as a wearable device may have a light guide system. The light guide system may have one or more light guide members. The light guide members may be formed from transparent elastomeric material such as silicone or other flexible material. Light sources such as light-emitting diodes and/or lasers may be used to supply light to the light guide members. The light guide members may have light-scattering structures that are configured to scatter light out of the light guide members at one or more locations along the lengths of the light guide members. Optical isolation layers such as coatings of white polymer or other flexible structures may be used to help confine light within the light guide members. A detector may be coupled to a light guide to detect light guide deformation due to contact with an external object.

20 Claims, 9 Drawing Sheets

(56) References Cited

U.S. PATENT DOCUMENTS

| | | |
|---|---|---|
| 2009/0251888 A1* | 10/2009 | Douglas ................. G06F 1/163 |
| | | 362/103 |
| 2011/0129320 A1 | 6/2011 | Duchaine et al. |
| 2011/0176325 A1 | 7/2011 | Sherman et al. |
| 2011/0302694 A1 | 12/2011 | Wang et al. |
| 2013/0044215 A1* | 2/2013 | Rothkopf ................ G06F 3/041 |
| | | 345/173 |
| 2013/0106684 A1 | 5/2013 | Weast et al. |
| 2013/0131519 A1 | 5/2013 | LeBoeuf et al. |
| 2013/0235611 A1* | 9/2013 | Franklin ................ G09F 13/04 |
| | | 362/616 |
| 2015/0312946 A1 | 10/2015 | Chen |
| 2015/0357387 A1 | 12/2015 | Lee et al. |
| 2015/0360606 A1 | 12/2015 | Thompson et al. |
| 2015/0378391 A1 | 12/2015 | Huitema et al. |
| 2016/0290624 A1 | 10/2016 | Dai et al. |
| 2018/0368559 A1 | 12/2018 | Wang et al. |

* cited by examiner

ELECTRONIC DEVICES HAVING FLEXIBLE LIGHT GUIDES

This application claims the benefit of provisional patent application No. 62/791,520, filed Jan. 11, 2019, which is hereby incorporated by reference herein in its entirety.

FIELD

This relates generally to electronic devices, and, more particularly, to electronic devices with optical components.

BACKGROUND

Electronic devices may include devices for providing a user with output and devices for gathering input from a user. Some electronic devices may have flexible structures.

It may be difficult to provide electronic devices with desired functionality. For example, electrical components for providing an electronic device with desired functionality may be too bulky or unattractive to incorporate into the electronic device. In some situations, such as when electronic devices have flexible structures, components that might be used to provide desired functionality are rigid and tend to interfere with device operation.

SUMMARY

An electronic device such as a wearable device may have a light guide structure. The light guide structure may be formed within a housing such as a fabric housing or other flexible housing. The light guide structure may have one or more light guide members. The light guide members may be formed from transparent elastomeric material such as silicone or other flexible material. This allows the light guide structure to bend and otherwise change shape to accommodate device movement.

Light sources such as light-emitting diodes and/or lasers may be used to supply light to the light guide members. The light may travel within the light guide members. For example, the light guide members may have elongated strip shapes and the light may travel along the lengths of the light guide members in accordance with the principal of total internal reflection.

The light guide members may have light-scattering structures that are configured to scatter light out of the light guide members at one or more locations along the lengths of the light guide members. The emitted light may serve as visual output for a user of the electronic device. Optical isolation layers such as coatings of white polymer or other flexible structures may be used to help confine light to the light guide members.

In some configurations, a detector may be coupled to the end of each light guide member. The detector may be used to detect light guide deformation due to contact with an external object. Control circuitry within the electronic device may use light measurements with the detector to sense touch events.

DETAILED DESCRIPTION

An electronic device may have flexible transparent structures formed from flexible materials such as polymer. The material that forms the flexible transparent structures may be an elastomeric polymer material such as silicone, may be a flexible transparent polymer such as flexible acrylic, may be other flexible polymer material, or may be a flexible transparent such as flexible glass or other non-polymeric material.

The flexible transparent structures may form light guides. Light from light sources such as light-emitting diodes and/or lasers may be guided along the light guides. Portions of the light guides may be provided with light-scattering structures that help couple light out of the light guides. In this way, a light guide system may be used to emit light from desired locations on the surface of an electronic device.

Light guide systems formed from flexible light guides may also be configured to sense input such as touch input (e.g., pressure from a user's finger or other external object). Sensors may, for example, include devices for detecting light that is passing through a light guide in a system where the amount of light passing through the light guide is indicative of the amount of pressure applied to the light guide. The light that is detected may be visible light and/or may be non-visible light such as infrared light and/or ultraviolet light.

Light guide systems with one or more flexible light guides may be incorporated into devices with housing structures formed from flexible materials. For example, devices with housing structures that include fabric, flexible polymer, and/or other flexible materials may incorporate light guide structures. These devices may include wearable devices such as wristwatches, head-mounted devices, wrist bands, gloves and/or other items worn on a user's body (e.g., a user's wrist, head, arm, or other body part).

Figure 1:
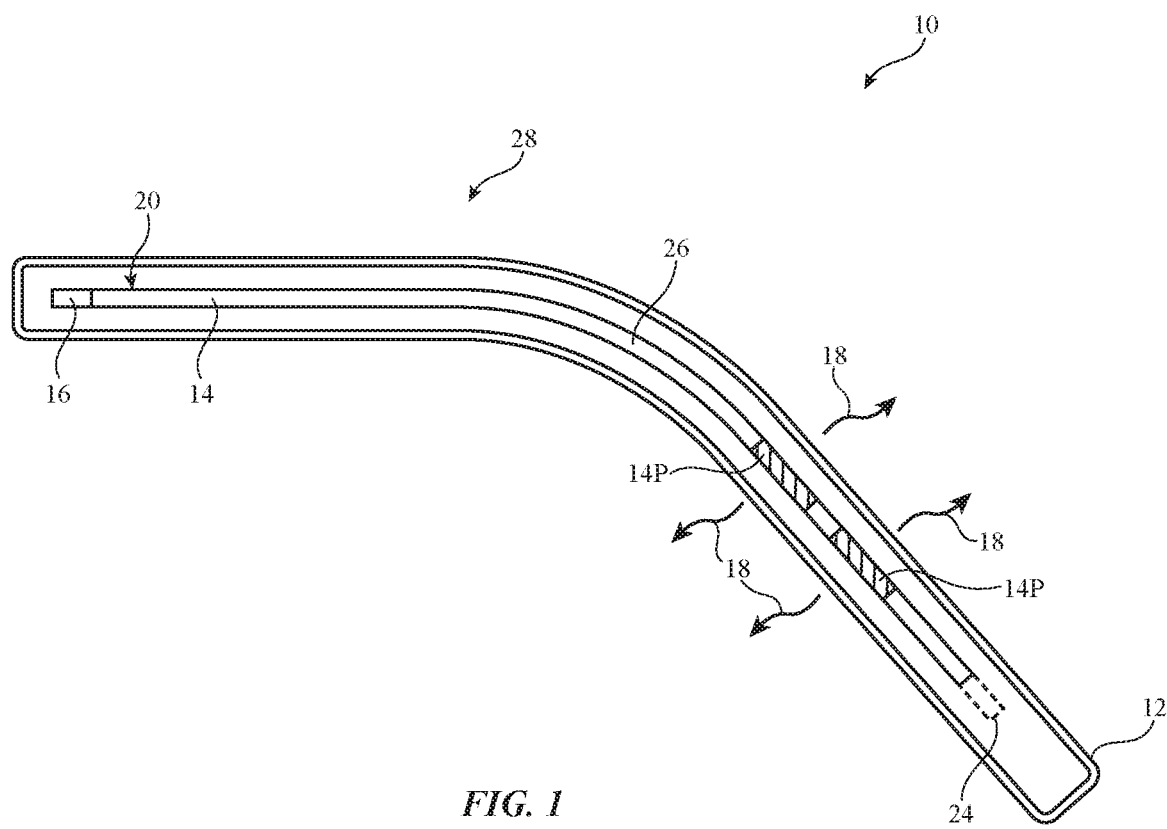
FIG. 1 is side view of an illustrative electronic device with a flexible light guide in accordance with an embodiment.

An illustrative electronic device of the type that may include a flexible light guide system is shown in FIG. 1. Device 10 may be a laptop computer, a computer monitor containing an embedded computer, a tablet computer, a desktop computer, a cellular telephone, a media player, or other handheld or portable electronic device, a smaller device such as a wristwatch device, a wristband device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices.

As shown in FIG. 1, device may have a housing such as housing 12. Housing 12 may be formed from materials such as polymer, glass, metal, ceramic, fabric, foam, wood, other materials, and/or combinations of these materials. Housing 12 may separate interior region (interior) 26 from exterior region (exterior) 28. Printed circuits, integrated circuits, mechanical structures, and other components may be located within the enclosure formed by housing 12.

Device 10 may include a light guide system such as light guide system 20. System 20 may include light guide structure 14 and light source 16. During operation, light source 16 may emit light into light guide structure 14. Light guide structure 14 includes one or more light guides that guide the emitted light (e.g., light may be guided within structure 14 in accordance with the principal of total internal reflection).

One or more portions of structure 14 such as portions 14P may include light-scattering structures that scatter the light that is passing through the light guide structure out of the light guide structure as illustrated by outwardly scattered emitted light 18. Light such as light 18 that is emitted from structure 14 may be emitted in one or more directions. In the example of FIG. 1, light 18 is being emitted in two opposite directions (e.g., from opposing upper and lower surface of light guide structure 14). Other configurations may be used, if desired. For example, light guide system 20 may be configured to emit light 18 only in a single outward direction.

Some or all of housing 12 may be transparent. For example, portions of housing 12 that overlap portions 14P may be transparent and may form optical windows that allow light 18 to pass from interior 26 to exterior 28. Transparent regions of housing 12 may be formed from transparent polymer, glass, ceramic, or other materials (with or without dye, pigment, or other colorant and with or without embedded light scattering features, and/or light-scattering surface roughness structures). Housing 12 may also contain portions formed from fabric. The fabric may be sufficiently transparent to allow light 18 to pass from interior 26 to exterior 28. For example, housing 12 may have fabric with perforations or with a loose weave, loose knit, or other construction that is sufficiently porous to allow light to pass through the fabric (e.g., to allow light to pass between the intertwined strands of material in the fabric). Fabric may also include transparent strands of polymer, glass, or other material that allows light to pass.

If desired, light guide system 20 may include one or more light detectors such as light detector 24. Light detector 24 may include one or more photodetectors such as photodiodes. Light detector 24 may be optically coupled to light guide structure 14 and may be used to measure light that is traveling through light guide structure 14 from light source 16 and/or may be used to measure light that has been received into light guide structure 14 from exterior 28 (e.g., ambient light that has passed into light guide structure 14 through portions 14P or other portions of light guide structure 14).

Light guide structure 14 may include one or more light guides of any suitable shape (e.g., elongated transparent members forming thick slabs or thin strip-shaped members, fibers, tapered blocks, conical shapes, and/or other shapes or combinations of these shapes). The cross-sectional shape of light guide structure 14 (e.g., the cross-sectional shape of an optical fiber, strip-shaped sheet of polymer, or other elongated waveguide) may be rectangular, circular, oval, square, may have other cross-sectional shapes with curved and/or straight edges, or may have other suitable shapes.

Figure 2:
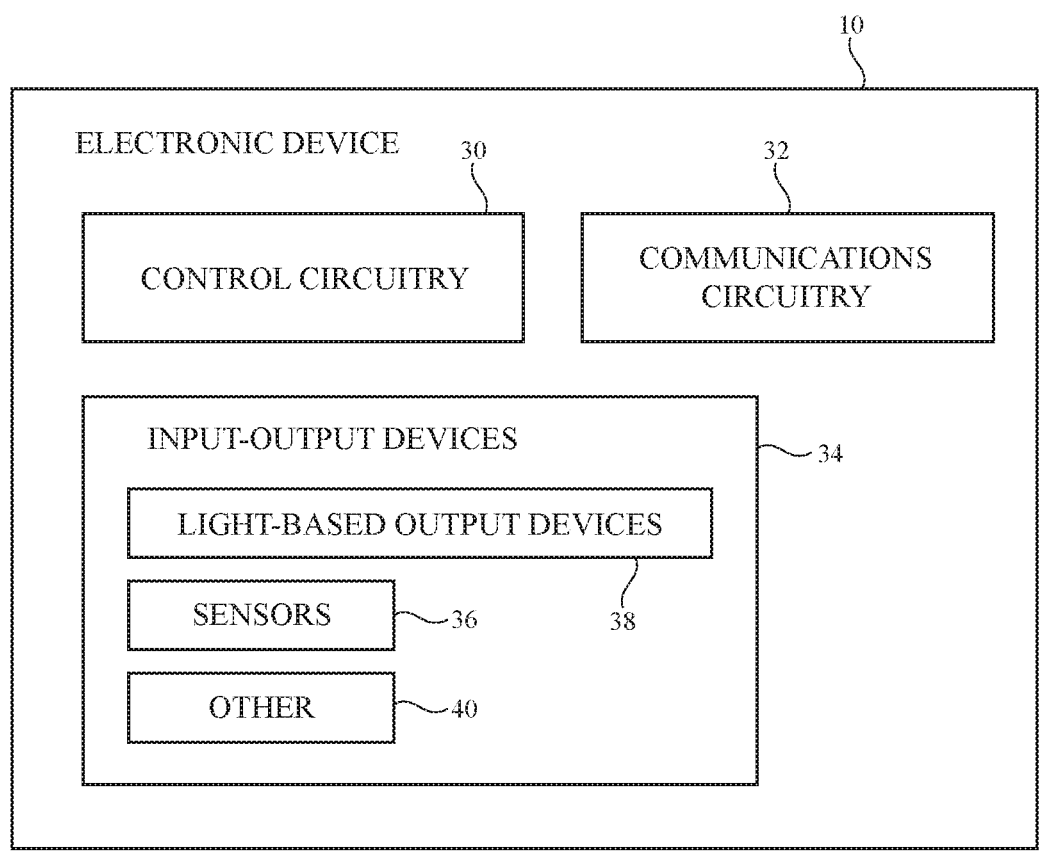
FIG. 2 is a schematic diagram of an illustrative electronic device in accordance with an embodiment.

A schematic diagram of an illustrative electronic device of the type that may include light guide system 20 is shown in FIG. 2. As shown in FIG. 2, device 10 may include control circuitry 30, communications circuitry 32, and input-output devices 34.

Control circuitry 30 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 30 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external electronic equipment, control circuitry 30 may communicate using communications circuitry 32. Communications circuitry 32 may include antennas, radio-frequency transceiver circuitry, and other wireless communications circuitry and/or wired communications circuitry. Circuitry 32, which may sometimes be referred to as control circuitry and/or control and communications circuitry, may, for example, support wireless communications using wireless local area network links, near-field communications links, cellular telephone links, millimeter wave links, and/or other wireless communications paths.

Input-output devices 34 may be used in gathering user input, in gathering information on the environment surrounding the user, and/or in providing a user with output. Devices 34 may include sensors 36. Sensors 36 may include force sensors (e.g., strain gauges, capacitive force sensors, resistive force sensors, etc.), audio sensors such as microphones, capacitive touch sensors, capacitive proximity sensors, other touch sensors, ultrasonic sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) and other biometric sensors, radio-frequency sensors (e.g., radar and other ranging and positioning sensors), humidity sensors, moisture sensors, and/or other sensors.

Input-output devices 34 may include optical components such as light-emitting diodes (e.g., for camera flash or other blanket illumination, etc.), lasers such as vertical cavity surface emitting lasers and other laser diodes, laser components that emit multiple parallel laser beams (e.g., for three-dimensional sensing), lamps, and light sensing components such as photodetectors and digital image sensors. For example, sensors 36 in devices 34 may include depth sensors (e.g., structured light sensors and/or depth sensors based on stereo imaging devices that can optically sense three-dimensional shapes), optical sensors such as self-mixing sensors and light detection and ranging (lidar) sensors that gather time-of-flight measurements and/or other measurements to determine distance between the sensor and an external object and/or that can determine relative velocity, monochromatic and/or color ambient light sensors that can measure ambient light levels, proximity sensors based on light (e.g., optical proximity sensors that include light sources such as infrared light-emitting diodes and/or lasers and corresponding light detectors such as infrared photodetectors that can detect when external objects are within a predetermined distance), optical sensors such as visual odometry sensors that gather position and/or orientation information using images gathered with digital image sensors in cameras, gaze tracking sensors, visible light and/or infrared cameras having digital image sensors configured to gather image data, optical sensors for measuring ultraviolet light, and/or other optical sensor components (e.g., light sensitive devices and, if desired, light sources), visible-light and/or infrared photodetectors coupled to light guides (see, e.g., light detector 24 of FIG. 1), associated light emitters (see, e.g., light source 16 of FIG. 1), and/or other optical components (one or more light-emitting devices, one or more light-detecting devices, etc.). These optical components may operate at any suitable wavelengths of light (e.g., visible, infrared, and/or ultraviolet).

Input-output devices 34 may have light-based output devices (see, e.g., light-based output devices 38) that are used to provide visual output to a user. Light-based output devices 38 may include one or more light-emitting diodes, one or more lasers, lamps, electroluminescent devices, and/or other light emitting components. If desired, light-based output devices 38 may include one or more pixels arrays. The pixel arrays may be used to form one or more displays. Displays in device 10 may be organic light-emitting diode displays, displays based on arrays of light-emitting diodes formed from crystalline semiconductor dies, liquid crystal displays, electrophoretic displays, microelectromechanical systems (MEMs) displays such as displays with arrays of moving mirrors, liquid-crystal-on-silicon displays, and/or other displays. Displays may have arrays of thousands of pixels or more to display images for a user. Status indicator lights, illuminated icons (e.g., backlight symbols associated with power indicators, battery charge indicators, wireless signal strength indicators, notification icons, etc.) may each have only a single light emitter or may have relatively small numbers of light emitters. For example, a battery charge status indicator light or other status indicator may have five independently controlled light-emitting diode each of which is used to illuminate a respective bar of a different length. Other light-based output devices may be used in device 10, if desired. In some arrangements, light-based output devices 38 may be associated with light guide structure 14. For example, icons and other patterned areas of housing 12 may be backlit by light 18 that is being emitted by overlapped portions 14P of light guide structure 14 (e.g., light guide structure 14 and associated light emitters in light source 16 may be used to form a status indicator, or other light-based output device 38).

If desired, input-output devices 34 may include other devices 40. Devices 40 may include speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 40 may also include power transmitting and/or receiving circuits configured to transmit and/or receive wired and/or wireless power signals. Devices 40 may include buttons, rotating buttons, push buttons, joysticks, keys such as alphanumeric keys in a keyboard or keypad, microphones for gathering voice commands, touch sensor input devices, accelerometers for gathering user input gestures such as tap gestures, and/or other devices for gathering user input. Devices 40 may also include output components such as haptic output devices and other output components (e.g., electromagnetic actuators or other actuators that can vibrate to provide a user with a haptic alert and/or haptic feedback associated with operation of a touch sensor or other input devices).

Figure 3A:
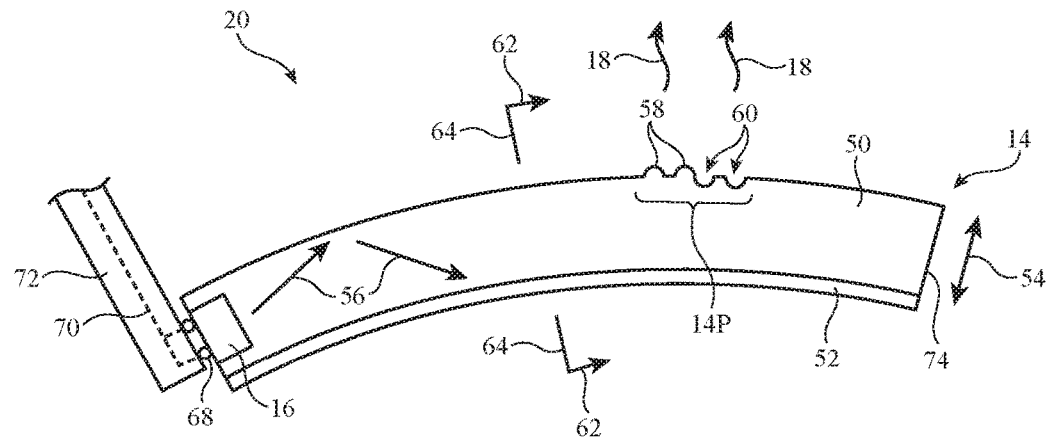
FIG. 3A is a cross-sectional side view of an illustrative light guide structure in accordance with an embodiment.

A cross-sectional side view of an illustrative light guide system is shown in FIG. 3A. As shown in FIG. 3A, light guide system 20 includes light guide structure 14. Light guide structure 14 may include a flexible light guide member such as light guide member 50. Member 50 may be an elongated flexible transparent member formed from a clear material such as polymer, glass, or other transparent material. As an example, member 50 may be formed from a transparent elastomeric polymer such as silicone or other flexible polymer. The material used to form member 50 may, if desired, have a modulus of elasticity (Young's modulus) of less than 5 MPa, less than 1 MPa, more than 0.1 MPa, or other suitable value. Member 50 may have low haze (e.g., to enhance light transmission) and/or may have one or more regions of higher haze (e.g., so that one or more portions of member 50 may diffuse light). Dye, pigment, and/or other colorant may be incorporated into one or more portions of member 50, if desired.

Light source 16 may be optically coupled to member 50. For example, light source 16 may include one or more light-emitting devices (e.g., visible and/or infrared light-emitting diodes, lasers, etc.) that are coupled to member 50 by embedding light source 16 in member 50 (e.g., by molding the polymer material of member 50 over light source 16), by pressing light source 16 against an exposed edge of member 50, by mounting an output surface of light source 16 adjacent to an opposing input surface of member 50, or by otherwise configuring structure 14 so that light that is emitted from light source 16 such as light 56 is emitted into the interior of member 50. Light 56 in member 50 may travel along the length of member 50 as shown in FIG. 3A. For example, member 50 may form a light guide (waveguide) that guides light in accordance with the principal of total internal reflection. Light may also be confined using metallic coatings and other light guide isolation structures.

Figure 3B:
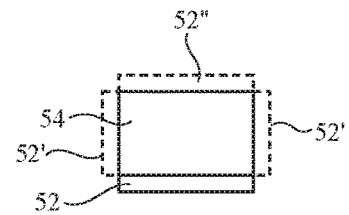
FIG. 3B is a cross-sectional view of the light guide structure of FIG. 3A.

As shown in FIGS. 3A and 3B, some or all of the surface of member 50 may be coated with layers (coatings) such as illustrative layer 52 to help confine light within member 50. FIG. 3B is a cross-sectional side view of structure 14 of FIG. 3A taken along line 64 and viewed in direction 62 of FIG. 3A. As shown in FIG. 3A, layer 52 may be located on the lower surface of member 50 (e.g., in an arrangement in which member 50 has a rectangular cross section). Coating materials may also be formed on the sides of member 50

(see, e.g., illustrative side layers 52') and/or on the top of member 50 (see, e.g., illustrative upper surface layer 52"). These layers may be coatings formed from polymer (e.g., reflective polymer such as white polymer), metal (e.g., reflective metal layers), dielectric stacks of alternating higher and lower refractive index dielectric layers (e.g., dielectric mirror layers formed from inorganic and/or organic dielectric layers), and/or other coating materials. In some configurations, total internal reflection can be supported by forming coatings on member 50 from a material with a lower refractive index than member 50 (e.g., a flexible transparent coating material such as a low index refractive index polymer that serves as a waveguide cladding). Coatings on member 50 can run along the entire length of member 50 and may be formed on the end of member 50 (see, e.g., end 74 of FIG. 3A).

If desired, coatings (e.g., white polymer layers) can be omitted in one or more portions of member 50. For example, portions 14P may have light-scattering structures such as protrusions 58 (ridges, bumps, etc.), recesses 60 (grooves, pits, etc.), and/or embedded particles (solid or hollow microspheres, etc.) that are configured to scatter light 56 out of member 50 to form emitted light 18 in one or more non-contiguous portions 14P. To ensure that light 18 is not blocked, light-reflecting coatings (e.g., a white polymer layer) can be omitted from these regions of member 50 (e.g., a white polymer coating on member 50 may have openings that are each aligned with and overlap a respective portion 14P with light-scattering structures).

The light-emitting devices of light source 16 may emit visible light of any suitable color(s) for viewing by a user such as white light, red light, blue light, green light, yellow light, etc. Infrared light may also be emitted by light source 16, if desired.

Each light source 16 may contain one or more light-emitting devices. The light-emitting devices in light source 16 may be independently controlled. For example, light source 16 may be adjusted so that light 18 is red or may be adjusted so that light 18 is green. Different emitted colors of light may be used by device 10 to represent different types of information (e.g., to represent different operating states for device 10) or may otherwise be used to convey visual output to a user of device 10. To control the light-emitting device(s) of light source 16, signal lines may be coupled to the electrical terminals of the light-emitting devices. As shown in FIG. 3A, for example, electrical connections 68 (e.g., solder joints, welds, conductive adhesive connections, etc.) may be formed between the circuitry of light source 16 and metal traces 70 in printed circuit 72. Metal traces 70 may be used to form signal lines that supply control signals to light-emitting diodes, lasers, or other components in light source 16 from control circuitry 30. Printed circuit 72 may be a rigid printed circuit (e.g., a printed circuit formed from rigid printed circuit substrate material such as fiberglass-filled epoxy) or may be a flexible printed circuit (e.g., a printed circuit formed from one or more sheets of flexible substrate material such as one or more flexible polyimide layers).

During operation, the flexible nature of member 50 and optional coatings such as layer 52 of FIG. 3A allow structure 14 to bend. Structure 14 may, for example, be located adjacent to a body part of a user and may flex back and forth as the body part of the user moves. In this way, structure 14 may be used to route light from light source 16 to the light-scattering structures of portion 14P even as housing 12 and the rest of device 10 is bent and otherwise changes in shape to accommodate operation on the body of a user. Devices 10 that are not worn by a user may likewise experience bends and other changes in shape and the flexible nature of member 50 may also allow light 56 to be conveyed through light guiding structures in those devices.

The light-scattering structures of portions 14P may be configured to form alphanumeric characters, icons, or other suitable shapes or may be configured to form rectangular patches or patches of other shapes that backlight patterned opaque layers (e.g., black ink layers with alphanumeric openings and/or icon-shaped openings). Coating openings and light-scattering structures associated with portions 14P may be formed on outwardly facing surfaces of member 50, inwardly facing surfaces of member 50, sidewall surfaces, and/or other suitable surfaces of member 50.

Figure 4:
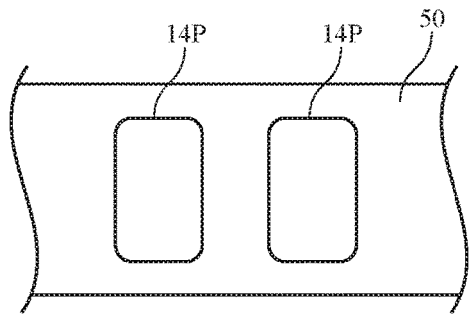
FIG. 4 is a top view of an illustrative light guide with regions containing non-contiguous light-scattering structures in accordance with an embodiment.

In the illustrative top view of member 50 of FIG. 4, there are two rectangular patches of light-scattering structures in two respective isolated portions 14P of member 50 (e.g., two portions 14P that are distinct, non-contiguous, and separated from each other by an intervening non-light-emitting area). These patches may be covered with housing material (see, e.g., housing 12 of FIG. 1) such as fabric, polymer, and/or other housing material). During operation, light 18 may be emitted from these regions or regions that have been patterned to form icons, alphanumeric characters, or other shapes to provide visual output for a user. The visual output may be associated with the status of operation of device 10 (e.g., battery status, power status, sleep status, wireless charging status, wireless signal strength status, wireless local area network status) and/or other suitable status (unread message status, voice mail status, etc.). Visual output may serve to provide a user with notifications. For example, flashing light output can be provided to alert a user that an email message has been received or that an incoming voice and/or video call is being received. In other configurations, light output may be provided to serve as feedback. For example, when a user touches a touch sensor on the surface of device 10 (e.g., a capacitive touch sensor, optical touch sensor, or other touch sensitive component that is overlapped by housing 12), control circuitry in device 10 can modulate light source 16 and thereby create a flash of emitted light 18 that serves as a visual confirmation that the touch input has been received.

Figure 5:
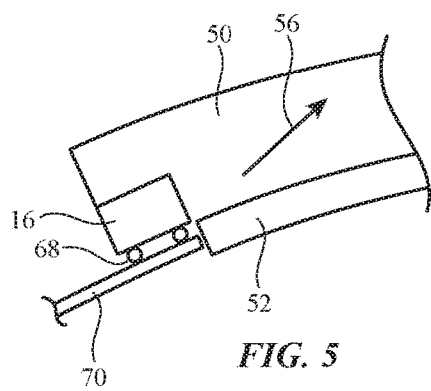
FIG. 5 is a cross-sectional side view of an illustrative light guide in accordance with an embodiment.

Light sources such as light source 16 may be optically coupled to member 50 at one or more locations along the length of member 50. In the example of FIG. 3A, printed circuit 70 extends along a direction that is perpendicular to member 50. As shown in FIG. 5, for example, printed circuit 70 may run parallel to member 50. Light source 16 may include edge emitting devices and/or surface emitting devices. The polymer material of light guide member 50 of FIGS. 3A and 5 may, if desired, be molded over light sources 16.

If desired, light guide structure 14 of light guide system 20 may include multiple light guides. For example, light guide structure 14 may have a set of elongated light guides that run parallel to each other. The light guides may be stacked on top of each other or may otherwise be coupled to form a bundle of light guides. In this type of arrangement, each of the light guides in light guide structure 14 may bend together as light guide structure 14 is moved during use of device 10.

Light guide structure 14 may have light guide isolation structures that help optically isolate light guides from each other. For example, light guide structure 14 may have one or more layers such as layers 52, 52', and 52" of FIG. 3B to help optically isolate each light guide. In some arrangements, a white polymer layer or other light guide isolation layer may be interposed between adjacent light guides. Light guide isolation structures may be formed from reflective structures (e.g., layers of white polymer, metal, dielectric mirror coatings, etc.) and/or optical waveguide cladding materials (e.g., material having a lower index of refraction than the core portion of the light guide that is formed from members such as members 50) to help isolate individual light guides from each other.

By isolating light guides from each other, different light guides can be used to carry light from different respective light sources 16. For example, a first light guide member 50 may carry blue light, a second light guide member 50 may red light, and a third light guide member 50 may carry green light. These different colors of light (or light of the same color from different light sources) can be adjusted individually. For example, red light intensity can be adjusted to provide a user with red light output in a first region of device 10 and blue and green light intensities can be separately adjusted to provide a user with blue and green light output in respective second and third regions of device 10.

Figure 6:
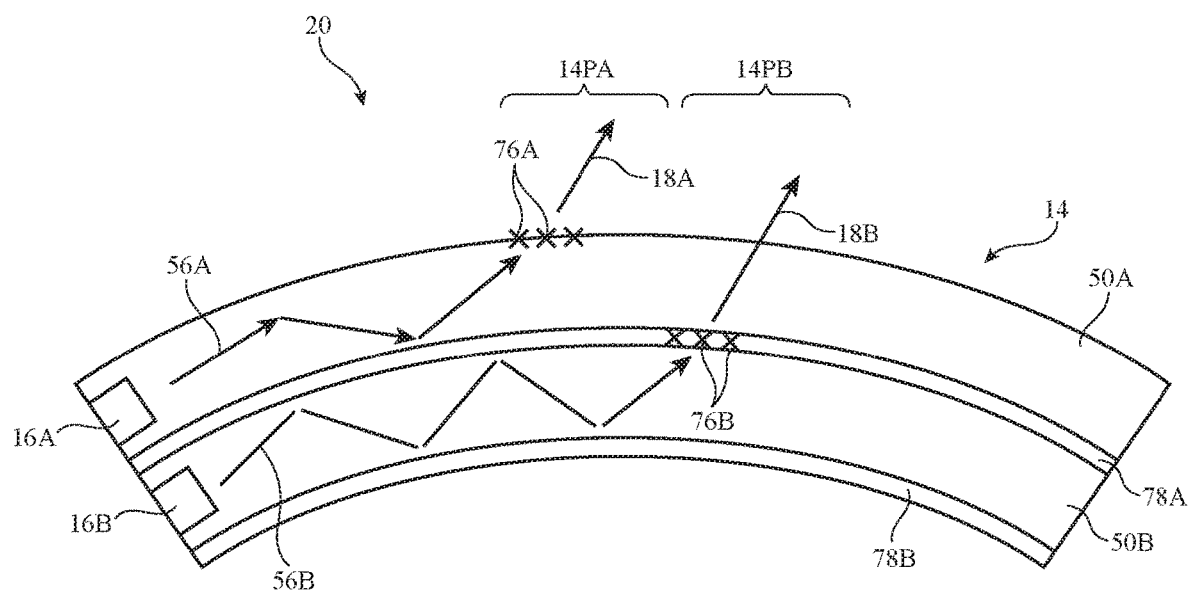
FIG. 6 is a cross-sectional side view of an illustrative light guide system having multiple parallel light guides that are coupled to each other in accordance with an embodiment.

Consider, as an example, the arrangement of FIG. 6. In the example off FIG. 6, light guide structure 14 of light guide system 20 includes a first light guide formed from first light guide member 50A and a second light guide formed from second light guide member 50B. Light source 16A may supply light 56A to light guide member 50A, which is coupled out of light guide member 50A in portion 14PA by light-scattering structures 76A as first emitted light 18A. Light source 16B may supply light 56B to light guide member 50B, which is coupled out of light guide member 50B in portion 14PB by light-scattering structures 76B as emitted light 18B. Light guide members 50A and 50B may be covered on one or more sides by reflectors and/or low-index cladding material. These covering layers (e.g., coatings, etc.) may serve as light guide isolation structures. In the example of FIG. 6, isolation structure (layer) 78A is formed between the lower surface of member 50A and the opposing upper surface of member 50B. Members 50A and 50B may be, for example, thin elongated strips of elastomeric polymer (e.g., silicone). Portions 14PA and 14PB may be used to form patches (see, e.g., the rectangular outlines of portions 14P of FIG. 4) or other shapes (e.g., icons, alphanumeric characters, etc.). With this type of configuration, emitted light 18A and emitted light 18B can be used to provide a user with notifications and other visual output.

Isolation structure 78A of FIG. 6 may be a layer of white polymer, a dielectric mirror layer, a metal layer, a low-index cladding layer, and/or other structure that helps confine light 56B in member 50B and that helps confine light 56A in member 50A and thereby helps prevent light that is being guided within one light guide from leaking into and being guided within another light guide. Although isolation structure 78A helps prevent guided light leakage between light guides, scattered light from one light guide may, if desired, pass laterally through another light guide. As shown in FIG. 6, for example, light that is scattered out of light guide member 50B by light-scattering structures 76B may pass laterally through light guide member 50A to form emitted light 18B. In this example, emitted light 18B is traveling upwards and almost parallel to the surface normal of light guide member 50A (which has a longitudinal axis that is approximately horizontal) and is therefore not guided along the length of light guide member 50A in accordance with the principal of total internal reflection. Rather, light 18B passes directly from the lower to the upper surface of member 50A through member 50A (without internal reflections) so that light 18B can be observed by a user.

Two light guides are stacked in the arrangement of FIG. 6, but, in general, any suitable number of stacked light guides may be included in light guide structure 14, each of which may be used in longitudinally guiding light from a respective individually controlled light source. Light-scattering structures may be formed at one or more locations along the length of each light guide member. The outermost light guide in a stack may emit scattered light directly outwards. The innermost light guide(s) may scatter light through overlapping upper-layer light guides and/or may scatter light through openings that have been formed in the upper light guide layers.

The presence of isolation structure 78A helps confine light 56B to member 50B and helps confine light 56A to member 50A. If desired, additional isolation structures (reflective layers, cladding, etc.) may be provided to enhance light guiding. For example, illustrative isolation structure 78B may be provided on the lower surface of light guide member 50B. Structures 78B may be formed from a layer of white polymer, metal, dielectric mirror structures, cladding material, and/or other isolation structure material and may help confine light 56B to member 50B. Structures such as these may also be provided on the upper (outermost) surface of member 50A and/or on the sidewall surfaces of members 50A and 50B.

Light guide members such as illustrative members 50A and 50B may be coupled mechanically (e.g., by forming waveguides on top of each other in a stack as shown in FIG. 6 or by forming other types of coupled sets of light guides) and/or light guide system 20 may include multiple independent light guide members that are not coupled along their lengths. Light guide members in system 20 may have any suitable cross-sectional shape (circular, oval, square, rectangular, etc.). In some configurations, the light guide members may have rectangular cross-sectional profiles as shown in FIG. 3B. In this type of configuration, each light guide member may have a width W (measured horizontally in the example of FIG. 3B) and a height H (measured vertically in the example of FIG. 3B). The light guide members may form thin strips (e.g., the aspect ratio R=W/H of the light guide members may be at least 2, at least 5, at least 10, at least 15, at least 20, less than 50, less than 25, or other suitable value). In arrangements in which light guide structure 14 has a relatively large aspect ratio (e.g., when light guide structure 14 is formed from a flexible layer of material that has an elongated strip shape), light guide structure 10 may be incorporated into electronic devices with similarly thin and elongated shapes (e.g., devices with thin planar housing portions such as straps, face mask housing structures, etc.).

Figure 7:
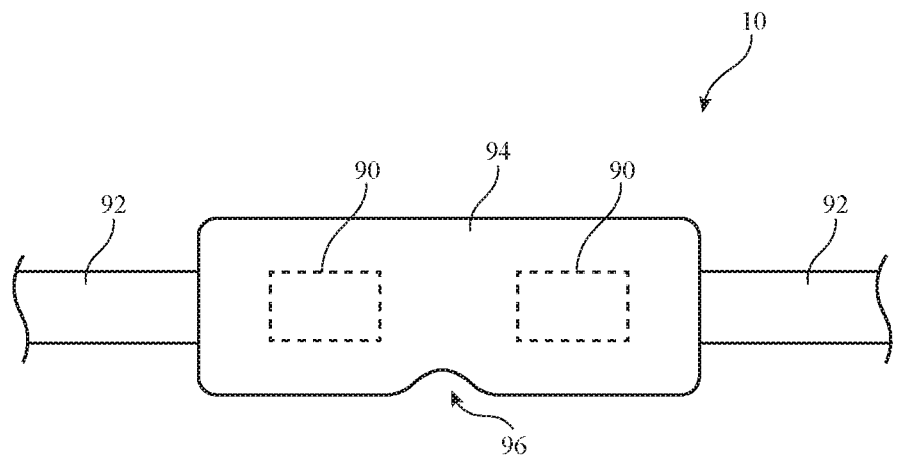
FIG. 7 is a front view of an illustrative wearable item such as a face mask or other head-mounted device in accordance with an embodiment.

Light guide structure 14 may be incorporated into wearable electronic devices or other electronic equipment. FIG. 7 is a rear (inner) view of an illustrative electronic device. In the example of FIG. 7, device 10 is a head-mounted device (e.g., a face mask to be worn against a user's face while a user is resting or sleeping, or other item wearable on a user's head). Device 10 of FIG. 7 has support structures that are configured to be worn on a user's head such as head strap 92. Housing portion 94 of device 10 may be formed from fabric, polymer structures, metal, and/or housing structures formed from other materials. Recess 96 may be formed along the lower edge of portion 94 to help accommodate a user's nose. Light guide structure 14 and other components of light guide system 20 may be supported within the housing of device 10 (e.g., within housing portion 94) and may have light sources and light guide members that guide light to light-scattering structures in light emission regions such as regions 90. Regions 90 may, for example, be configured to align with a user's left and right eyes when device 10 is worn on a head of a user.

Figure 8:
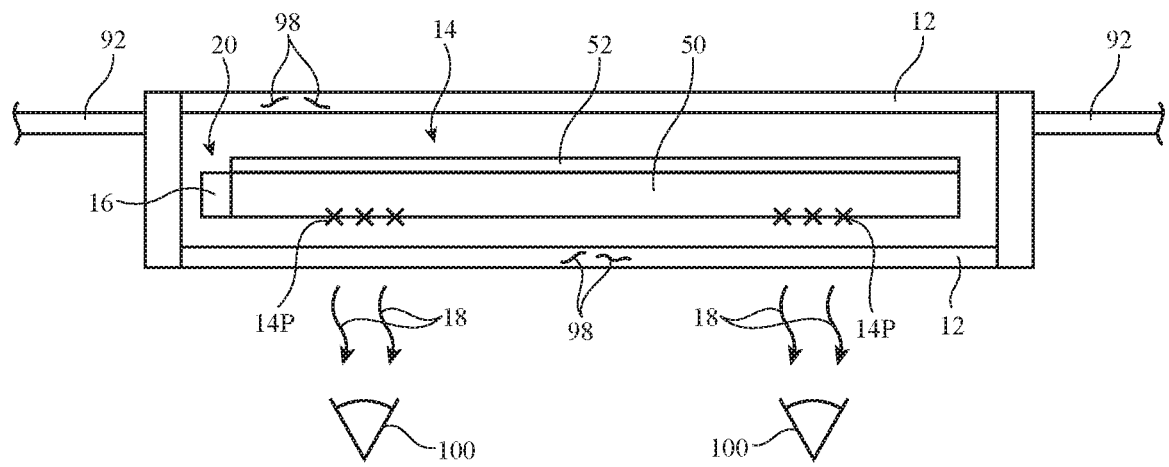
FIG. 8 is a top view of the illustrative device of FIG. 8 in accordance with an embodiment.

A cross-sectional top view of device 10 of FIG. 7 is shown in FIG. 8. As shown in FIG. 8, light source 16 of system 20 may emit light into light guide member 50 of light guide structure 14. Layer 52 may help confine light in light guide member 50. In portions 14P of light guide structure 14 (see, e.g., regions 90 of FIG. 7), light guide member 50 has light-scattering structures that cause guided light in member 50 to be scattered outwards as emitted light 18 towards a user's eyes 100. Housing 12 may be formed from a layer of polymer, structures formed from materials such as ceramic, metal, wood, natural materials such as cotton, and/or other materials, and/or may be formed from fabric having intertwined strands of material such as strands 98. Strands 98 may be monofilaments or multifilament yarns and may be formed from polymer, cotton or other natural materials, metal, and/or other materials. Transparent windows may be formed in housing 12 such as in locations where housing 12 overlaps portions 14P (e.g., by creating regions of loosely woven or knit fabric, patches with transparent fabric such as clear polymer fabric, openings in fabric, and/or other optical window structures). This allows light 18 to pass through housing 12 to reach eyes 100. Emitted light 18 in portions 14P (regions 90 of FIG. 7) may be used to wake a sleeping user and/or may otherwise be emitted under control of control circuitry 30 to provide a user with desired light-based output.

Figure 9:
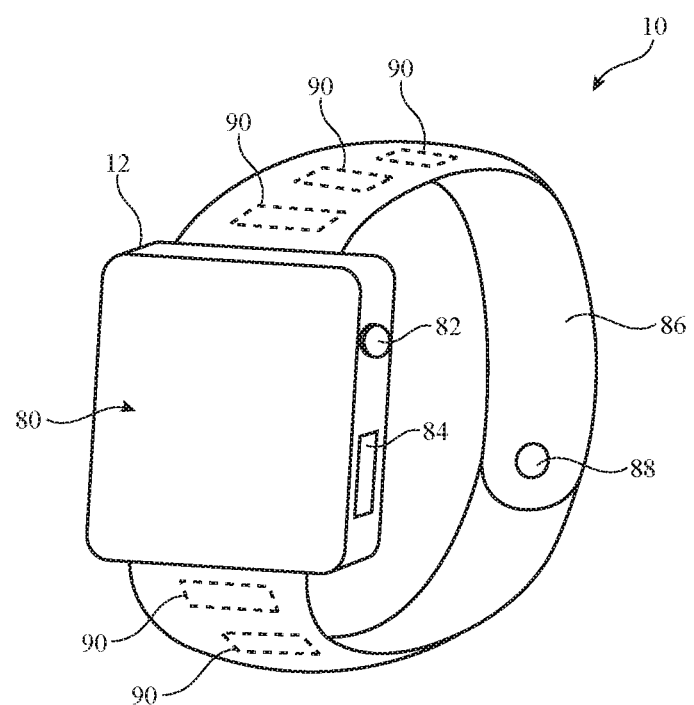
FIG. 9 is a perspective view of an illustrative wrist watch with a flexible light guide in accordance with an embodiment.

FIG. 9 is a perspective view of device 10 in an illustrative configuration in which device 10 is a wristwatch device. As shown in FIG. 9, device 10 may have a display such as display 80 formed on a front face of a main rigid portion of housing 12. Buttons such as buttons 82 and 84 may be provided in this main portion of housing 12 to gather user input. Housing 12 may also have portions forming wrist strap 86. If desired, a clasp such as clasp 88 may be used to attach segments of strap 86 together. Strap 86, which may sometimes be referred to as a band, may be formed from fabric, metal links, polymer, ceramic, wood, glass, natural materials such as cotton, and/or other materials. Light guide structures 14 may be located in one or both halves of a two-part strap such as illustrative strap 86 of FIG. 9, may extend along some or all of the length of a single-segment strap coupled to the main portion of housing 12, and/or may otherwise be formed within the housing structures forming a wrist strap for device 10. This allows light guide structure 14 to emit light in one or more light-emission regions 90 associated with respective portions 14P with light-scattering structures. Multiple regions 90 may be illuminated by a single light source and light guide member or each of multiple regions 90 may be individually provided with emitted light (e.g., using respective light guides and respective light sources 16). Each light source 16 may produce light of a single color or may be an adjustable light source that produces different colors (e.g., different colors selected by control circuitry 30).

Figure 10:
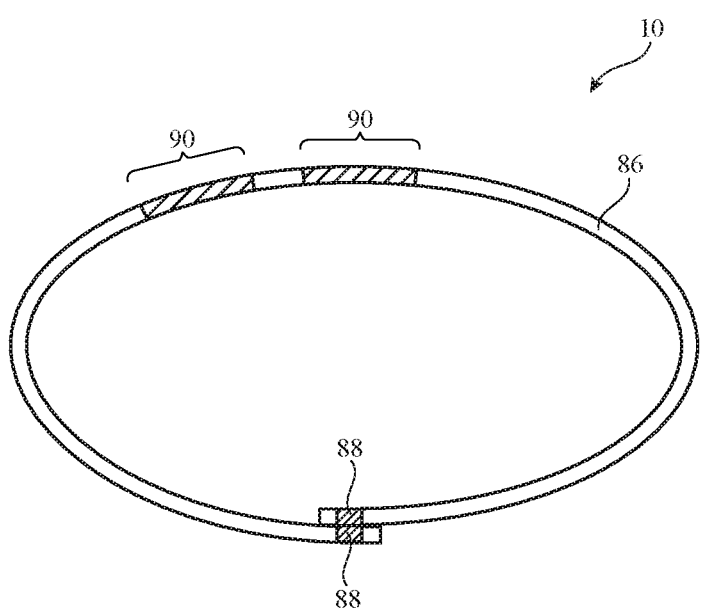
FIG. 10 is a cross-sectional side view of an illustrative wrist band with a flexible light guide in accordance with an embodiment.

In the illustrative example of FIG. 10, device 10 is a wrist strap without a rigid main housing portion (sometimes referred to as a health band or wristband device). Device 10 of FIG. 10 may have a housing (housing 12) that forms wrist strap 86. Strap 86 may have a single segment or, as shown in FIG. 10, may have first and second segments that are joined using clasp 88. A wrist band device such as device 10 of FIG. 10 may have a light guide structure system 20 with a light guide structure 14 that emits light in one or more light-emitting regions 90.

If desired, light guide structure system 20 may include a light detector such as light detector 24 of FIG. 1 and may be used as a sensor. As an example, a light detector may be coupled to an end of light guide member 50 and may be used to gather ambient light measurements.

As another example, light guide member 50 may be configured to exhibit an amount of light transmission that varies as a function of the shape of light guide member 50. In this type of arrangement, pressure on light guide member 50 may change the amount of light guided along light guide member 50. By monitoring the amount of light conveyed along member 50, control circuitry 30 can determine whether pressure is being exerted on member 50. The measured light may be visible light, infrared light, and/or infrared light.

Figure 11:
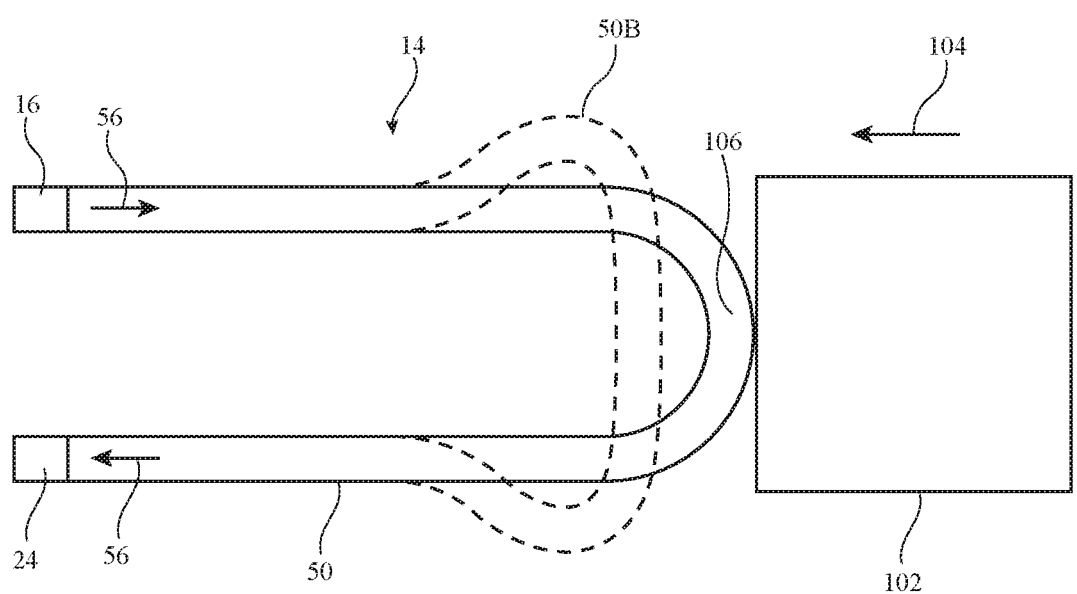
FIG. 11 is a side view of an illustrative optical sensor with a light guide for sensing touch input in accordance with an embodiment.

Consider, as an example, the arrangement of FIG. 11. In the example of FIG. 11, light guide structure system 20 has a light source such as light source 16 that emits light 56 (e.g., visible, infrared, and/or ultraviolet light) into light guide member 50 at a first end of light guide member 50. Light guide system 20 also has a light detector such as light detector 24 at an opposing end of light guide member 50 that detects light 56. Control circuitry 30 adjusts light source 16 to emit light 56 while monitoring detected light at detector 24. In the absence of pressure on light guide member 50, light guide member 50 may have an undeformed shape that transmits a first amount of light 56 to detector 24. In the presence of pressure on portion 106 of light guide member 50 in direction 104 by external object 102, however, light guide member 50 may be bent into the deformed shape shown by deformed light guide member 50B of FIG. 11. This causes some or all of light 56 to leak out of light guide member 50 (e.g., light guiding by total internal reflection is locally defeated), so that the amount of light 56 that is detected by detector 24 is reduced to a second amount that is less than the first amount. During operation, control circuitry 30 can detect changes in the amount of light 56 detected by detector 24 and can convert these detected light measurements into measurements of touch (e.g., pressure) on portion 106 of member 50. In this way, light guide structure 14 forms a touch sensor. The touch sensor, which may also sometimes be referred to as a pressure sensor or force sensor, may detect events where portion 106 is contacted and thereby deformed by external objects such as object 102.

Figure 12:
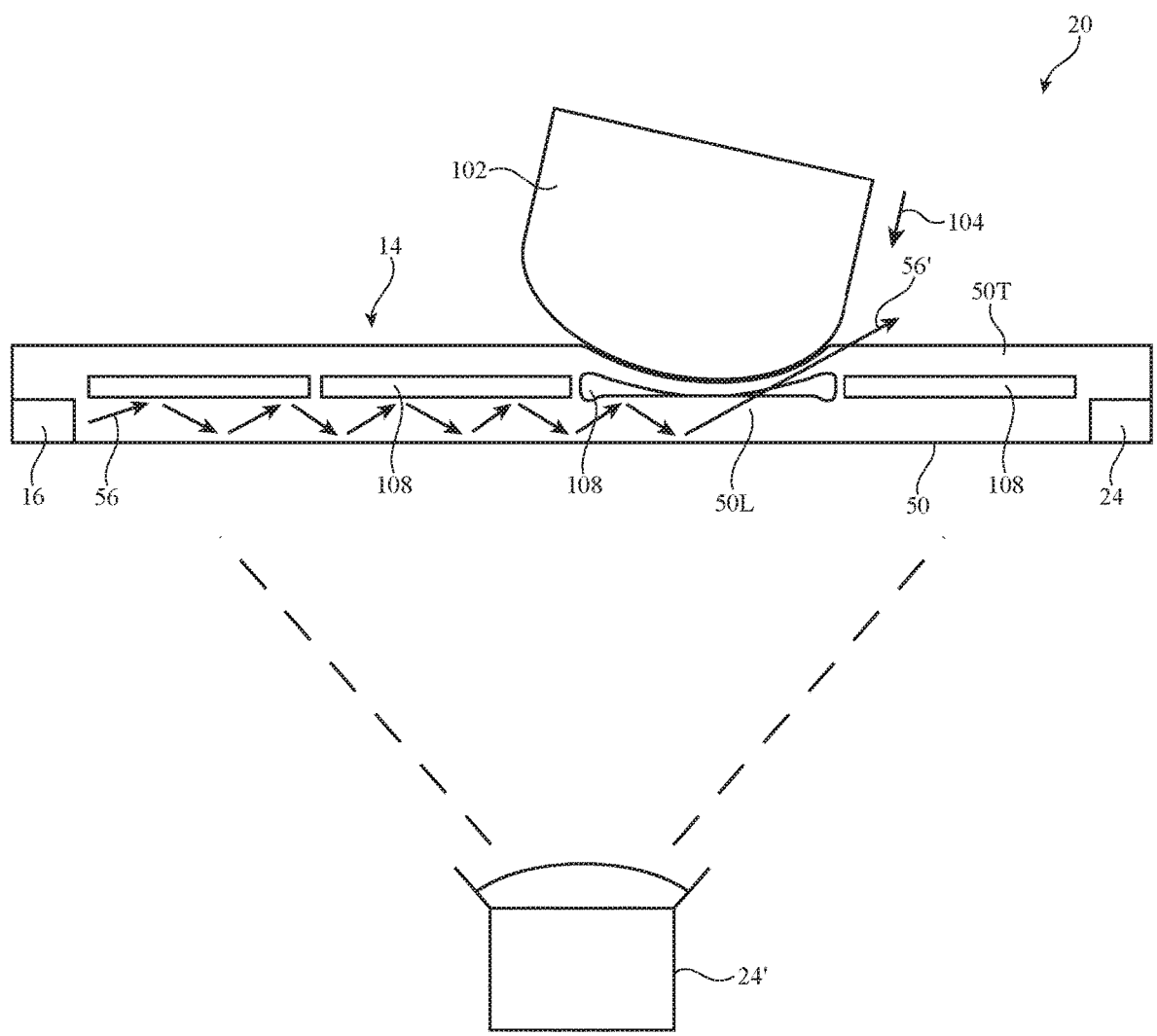
FIG. 12 is a cross-sectional side view of an illustrative optical sensor with a light guide having collapsible structures for sensing touch input in accordance with an embodiment.

Another illustrative optical touch sensor that may be formed using light guide structure 14 is shown by illustrative light guide system 20 of FIG. 12. In the illustrative configuration of FIG. 12, light guide member 50 of light guide structure 14 has upper portion 50T and lower portion 50L. Portions 50T and 50L are separated by cavities 108. Cavities 108 may be filled with air, liquids such as water or oil, or other fluids. The fluid of cavities 108 may have a lower refractive index than the material of lower portion 50L. Accordingly, when light guide member 50 is not being touched by an external object, light 56 that is emitted by light source 16 at one end of light guide member 50 may be guided in accordance with the principal of total internal reflection along the entire length of portion 50L and may be detected by light detector 24 at the opposing end of light guide member 50. In the presence of pressure from external object 102 in direction 104, one or more of cavities 108 may be deformed sufficiently to allow upper portion 50T to contact lower portion 50L. This locally defeats total internal reflection and allows at least some of light 56 to escape portion 50L at the point at which portions 50T and 50L contact each other, as illustrated by escaping light 56' in FIG.

12. Control circuitry 30 can measure the amount of light transmitted through portion 50L during operation using detector 24. Touch events can be detected by detecting drops in the amount of light that is received at detector 24.

The light emitted by light source 16 and detected by detector 24 may include visible light, infrared light, and/or ultraviolet light. Detector 24 may, if desired, be placed at other locations, as illustrated by illustrative detector location 24' of FIG. 12. The detector (light-sensing optical component) at location 24' may be a photodetector (e.g., a visible or infrared photodetector), a two-dimensional image sensor (e.g., a visible-light camera or an infrared camera), or other light-sensitive device. In response to pressure from external object 102, some escaping light 56' may leak towards location 24' and may be detected by the light-sensitive device at location 24'. For example, infrared or visible light may travel towards location 24' and may be detected using an infrared or visible image sensor at location 24'. Using an image sensor (visible or infrared), time-of-flight sensor, self-mixing sensor, array of photodetectors, and/or other location-sensitive optical sensors for detector 24, device 10 may, if desired, determine the location of touch events in addition to measuring pressure associated with touch events.

Figure 13:
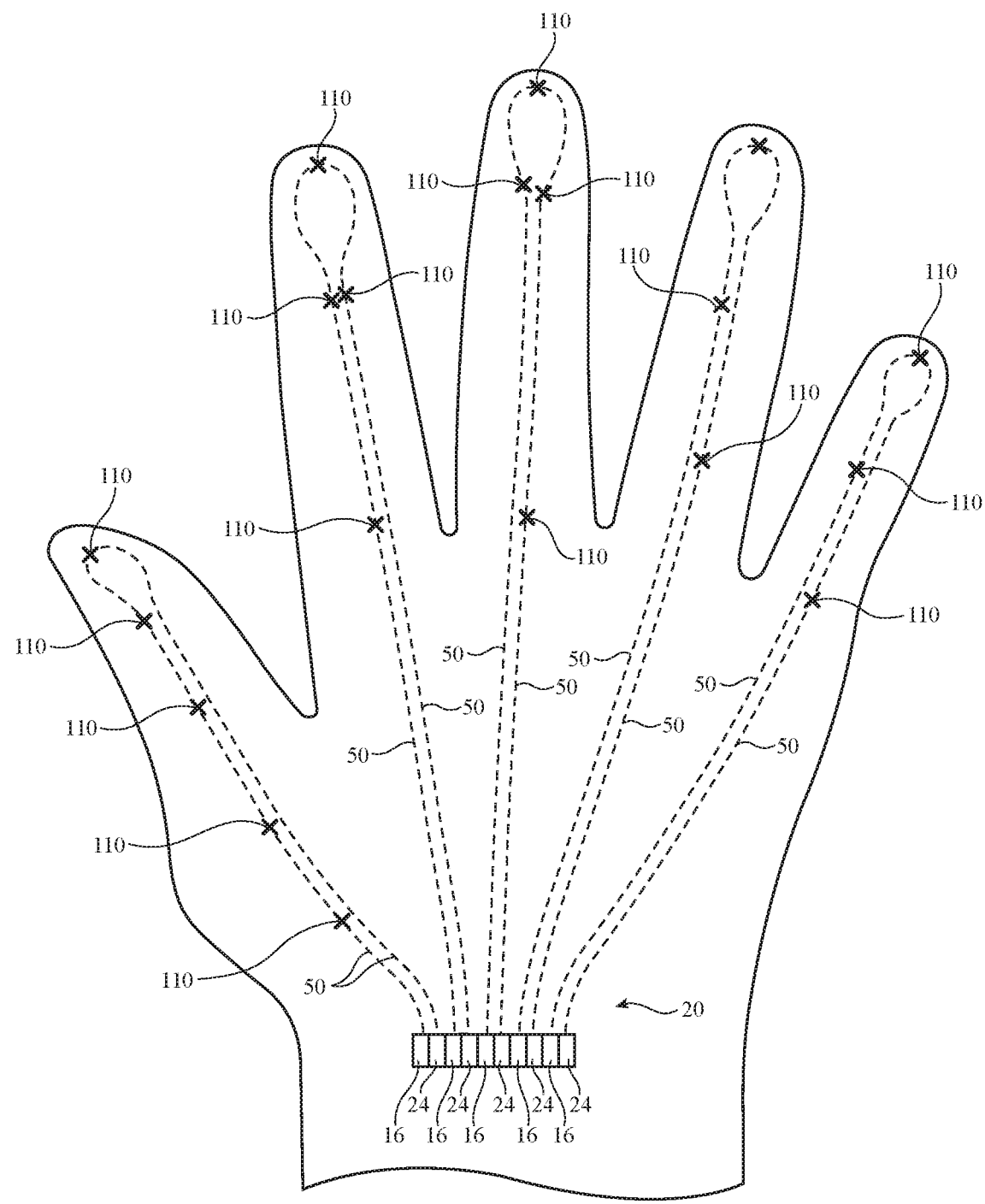
FIG. 13 is a top view of an illustrative wearable item such as a glove with a flexible light guide structure in accordance with an embodiment.

Optical touch sensors based on deformable light guides such as light guide(s) in light guide structure 12 may be used in any suitable type of electronic device (e.g., a wrist watch, wrist strap, head-mounted device, arm band, other wearable devices, etc.). In the illustrative example of FIG. 13, device 10 is a touch-sensitive glove having a hand-shaped housing 12. Light guide system 20 of FIG. 13 has multiple light guide members 50 each of which loops out and back along the length of a different respective finger in the glove. Deformation of the light guide members 50 may be sensed at illustrative locations such as locations 110. The amount of deformation may, if desired, be detected by measuring the magnitude of the drop in detected light at detectors 24 (e.g., the touch sensor arrangement of FIG. 13 may measure grasping force). If desired, multiple light guides 50 may be associate with each finger (e.g., to gather independent touch measurements due to deformations at multiple different locations along the length of each finger and thereby provide the glove-shaped touch sensor of FIG. 13 with additional spatial resolution when gathering touch sensor input). If desired, some or all of light guide members 50 may have portions 14P that emit light. The emitted light may form registration marks that facilitate optical tracking such as three-dimensional camera tracking using a pair of stereoscopic cameras or other optical tracking. Configurations in which device 10 of FIG. 13 has both light-emitting regions (formed form light-scattering structures on members 50) and deformable portions of members 50 for forming a touch sensor from structure 12 may also be used.

As described above, one aspect of the present technology is the gathering and use of information such as sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

What is claimed is:

1. An electronic device, comprising:
   a flexible housing comprising fabric;
   a light source in the flexible housing;
   control circuitry that is configured to control the light source;
   a flexible light guide member in the housing that has a portion adjacent to the light source that is configured to receive light from the light source;
   an optical isolation structure on the flexible member that is configured to help confine the light from the light source in the flexible light guide member; and
   light-scattering structures on the flexible light guide member that are configured to couple the light out of the light guide member and through openings in the fabric.

2. The electronic device defined in claim 1 wherein the flexible housing is configured to be worn on a body of a user, wherein the flexible housing has a portion through which the light that is coupled out of the light guide member passes, wherein the optical isolation structure comprises a coating selected from the group consisting of: a white polymer coating, a metal coating, and a dielectric stack coating, the electronic device further comprising a main housing portion coupled to the flexible housing and a display that is coupled to the main housing portion.

3. The electronic device defined in claim 1 wherein the flexible housing is configured to form a strap.

4. The electronic device defined in claim 3 wherein the flexible light guide member has an elongated shape with a length and wherein the light-scattering structures are configured to form a plurality of light-emission regions at different respective locations along the length.

5. The electronic device defined in claim 1 wherein the light source comprises a light-emitting diode that emits light into the flexible light guide member and wherein the light that is emitted into the flexible light guide member from the light-emitting diode is coupled out of the flexible light guide member at first and second respective non-contiguous light-emission regions using respective first and second non-contiguous portions of the light-scattering structures.

6. The electronic device defined in claim 1 further comprising a light detector that is configured to receive light from the flexible light guide member.

7. The electronic device defined in claim 1 further comprising:
   an additional flexible light guide member that is coupled to the flexible light guide member; and
   an additional light source that is configured to emit light into the additional flexible light guide member.

8. The electronic device defined in claim 7 wherein the light source is configured to emit light of a first color and wherein the additional light source is configured to emit light of a second color that is different than the first color.

9. The electronic device defined in claim 7 wherein the additional flexible light guide member has additional light scattering structures that are configured to scatter light out of the additional light guide member and through the flexible light guide member.

10. The electronic device defined in claim 9 wherein the optical isolation structure comprises a layer that is interposed between the flexible light guide member and the additional flexible light guide member.

11. The electronic device defined in claim 10 wherein the flexible light guide member and the additional flexible light guide member comprise clear elastomeric polymer.

12. The electronic device defined in claim 10 wherein the layer comprises flexible white polymer.

13. A wearable electronic device, comprising:
    a housing;
    a flexible light guide member in the housing, wherein the flexible light guide member is configured to be deformed in response to contact between an external object and the housing;
    a light source configured to emit light that is guided within the flexible light guide member;
    a light detector configured to measure the light that is guided within the flexible light guide member; and
    control circuitry configured to use measurements of the light that is guided within the flexible light guide member to detect the contact between the external object and the housing.

14. The wearable electronic device defined in claim 13 wherein the flexible light guide member has first and second portions separated by cavities.

15. The wearable electronic device defined in claim 13 wherein the housing is configured to be worn on a body part of a user.

16. The wearable electronic device defined in claim 13 wherein the housing comprises fabric.

17. The wearable electronic device defined in claim 13 wherein the housing is configured to form a glove with fingers and wherein the flexible light guide member extends along one of the fingers.

18. An electronic device, comprising:
    a wearable housing;
    first and second flexible polymer light guide members in the wearable housing having respective first and second light-scattering structures;
    a flexible optical isolation layer that is coupled between a surface of the first flexible polymer light guide member and a surface of the second flexible polymer light guide member and that optically isolates the first and second flexible polymer light guide members;
    a first light source configured to emit first light into the first flexible polymer light guide member that is scattered out of the first flexible polymer light guide member by the first light-scattering structures; and
    a second light source configured to emit second light into the second flexible polymer light guide member that is scattered out of the second flexible polymer light guide member by the second light-scattering structures.

19. The electronic device defined in claim 18 wherein the second light-scattering structures are configured to scatter the second light out of the second flexible polymer light guide member and through the first flexible polymer light guide member.

20. The electronic device defined in claim 18 further comprising a light detector coupled to the first polymer light guide member.

* * * * *